Nov. 13, 1945.  V. J. TICHOTA  2,389,094
DRAFT EQUALIZER
Filed June 29, 1944  2 Sheets-Sheet 1

V. J. Tichota
INVENTOR.

BY
ATTORNEYS.

Nov. 13, 1945.   V. J. TICHOTA   2,389,094
DRAFT EQUALIZER
Filed June 29, 1944   2 Sheets-Sheet 2

V. J. Tichota
INVENTOR.

BY *Knowles*
ATTORNEYS.

Patented Nov. 13, 1945

2,389,094

UNITED STATES PATENT OFFICE 2,389,094

DRAFT EQUALIZER

Vencel J. Tichota, Dodge, Nebr.

Application June 29, 1944, Serial No. 542,697

4 Claims. (Cl. 280—33.44)

The device forming the subject matter of this application is a draft equalizer, and the object of the invention is to provide a simple structure wherein, through the instrumentality of a tongue or lever, a cross bar, and a simple linkage, side draft will be avoided. Another object of the invention is to supply a device of the class described in which friction will be reduced. A further object of the invention is to provide a draft equalizer capable of being yoked to a wide tread tractor, to a narrow tread tractor, and to either of such instrumentalities when a corner is to be turned.

Within the scope of what is claimed, the structure described and shown may be changed, without departing from the spirit of the invention.

Figure 1:
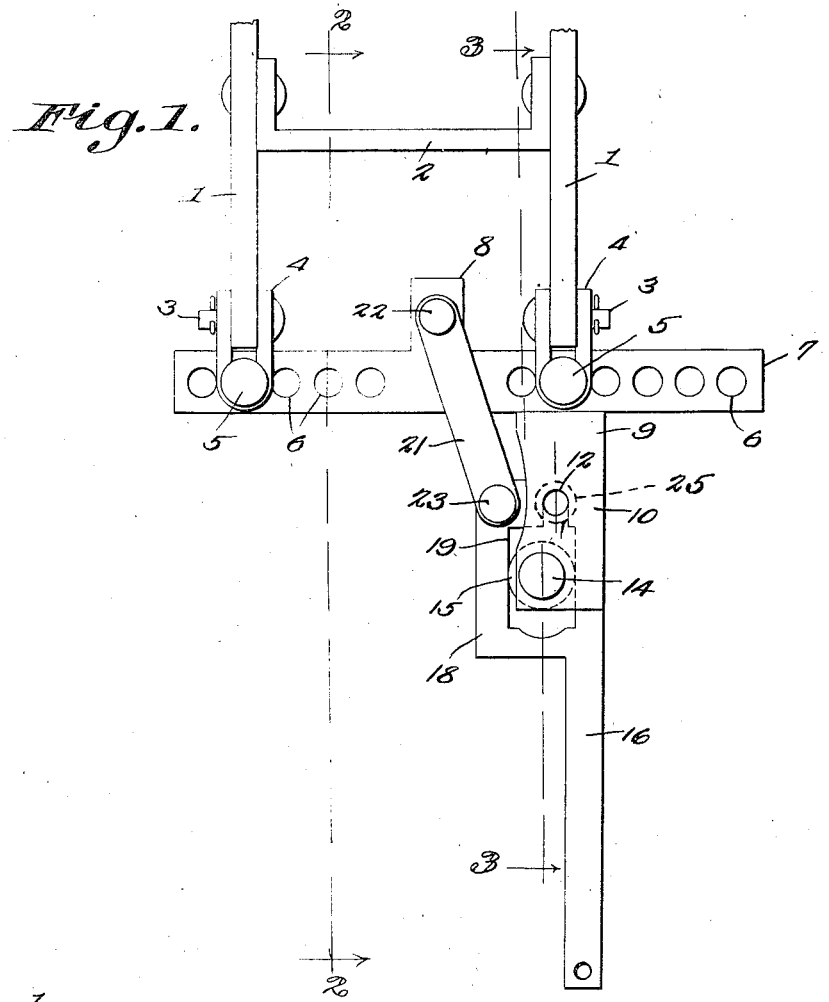
Fig. 1 shows in top plan, a draft equalizer constructed in accordance with the invention, the parts being arranged as they will appear when the device is assembled with a wide tread tractor and portions of a plow structure being shown.
Figure 2:
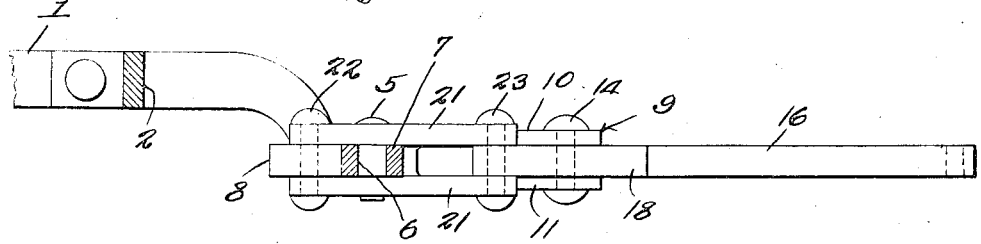
Fig. 2 is a longitudinal section on the line 2—2 of Fig. 1.
Figure 3:
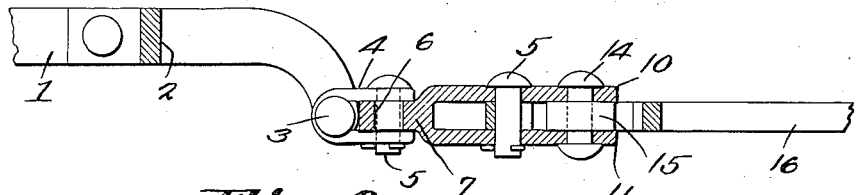
Fig. 3 is a longitudinal section on the line 3—3 of Fig. 1.

The numeral 1 designates a pair of parallel plow beams connected near their forward ends by a rigid cross brace 2.

In the forward ends of the beams 1 are mounted horizontal pivot pins 3 on which forwardly extended clevises 4 are mounted to swing vertically. In the clevises 4 are disposed vertical pins 5, adapted to be received in openings 6, spaced apart longitudinally of a cross bar 7.

At a point midway between its ends, the cross bar 7 is supplied with a rearwardly prolonged extension 8, located at right angles to the cross bar. The cross bar 7 is supplied with a forward extension 9 placed nearer to one end of the bar than to the other, the extension 9 including an upper wall 10 and a lower wall 11, said walls having axially-alined vertical openings 12.

The extension 9 carries a shaft rivet 14, on which a roller 15 is mounted to rotate.

The numeral 16 marks a tongue, supplied with a clevis 17 for connection with a tractor (not shown). At its rear end, the tongue 16 has a laterally-projecting flange 18, the tongue and its flange being mounted to swing horizontally between the walls 10 and 11 of the extension 9 on the bar 7. The tongue 16 and flange 18 are equipped with an opening 19 which is elongated parallel to the draft line. The width of the opening 19 is equal to the diameter of the roller 15.

Links 21 are supplied, and are disposed above and below the cross bar 7 and above and below the flange 18 of the tongue 16. A vertical pivot element 22 connects the rear ends of the links 21 with the rear extension 8 of the cross bar 7, and a pivot element 23 connects the forward ends of the links with the flange 8 of the tongue 16 close to the rear end thereof.

Thus it will be seen that due to the construction shown and described, the draft will be equalized, particularly when deep plowing is necessary, to the end that side draft of the plow will be eliminated.

When the equalizer effect is not desired, for instance when the plows are being drawn to and from the field, a bolt or pin 25, indicated in Fig. 1, is inserted through the openings 12 of the extension 9 on the cross bar 7, the bolt or pin being received in the extension 20 of the opening 19 which is formed in the side flange 18 of the tongue 16.

Figure 4:
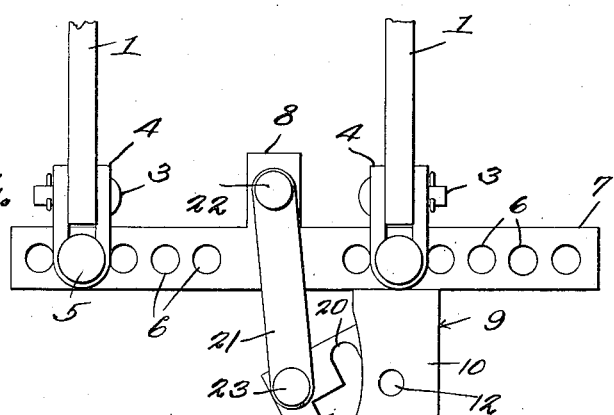
Fig. 4 is a top plan wherein the parts are shown as they will appear when the device is connected to a tractor and is turning a corner.
Figure 5:
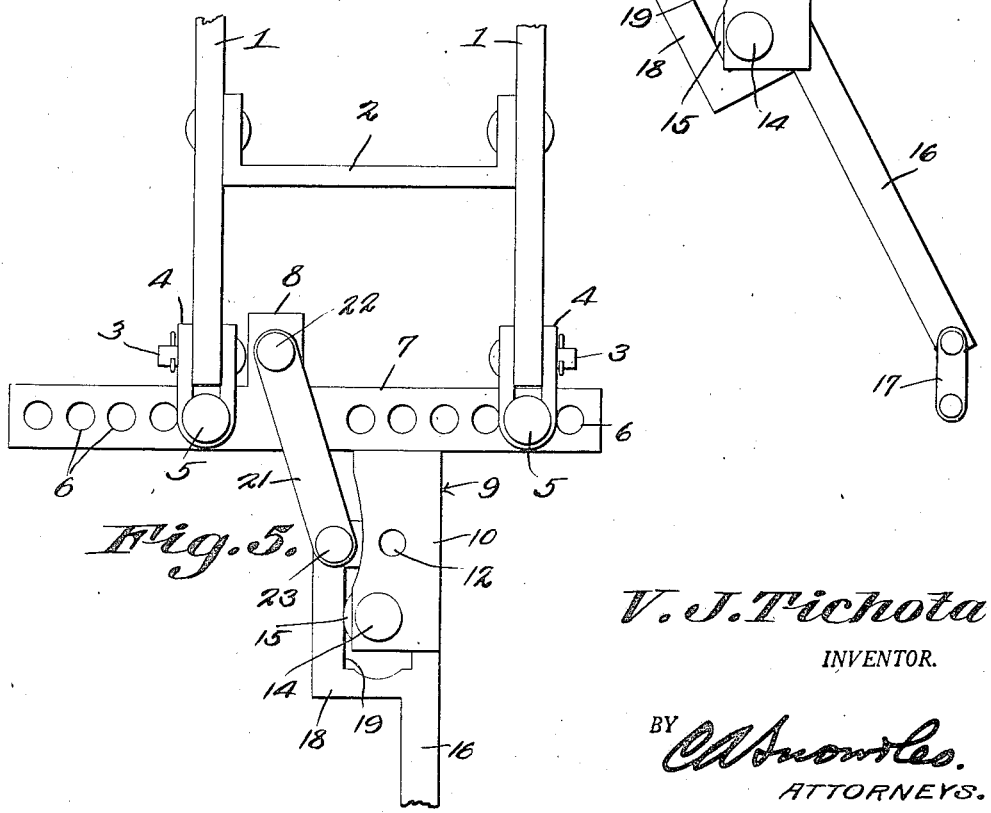
Fig. 5 is a top plan showing the parts as they will appear when the device is assembled with a narrow tread tractor.

When the device is to be used with a wide tread tractor, the parts appear as shown in Fig. 1, the pin 25 being removed, and the cross-bar has been moved to shift the extension 8 more in the direct line of draft, to compensate for the increased drag on the tongue, due to the wide tread and increased traction and when the device is employed in connection with a narrow tread tractor, the hook-up of Fig. 5 is used, wherein the bar 7 is shifted to bring the extension to a point slightly offset with respect to the direct line of draft, since a narrow tread tractor is capable of turning with less resistance than the wide tread tractor. Figure 4 shows the parts as they will appear when a corner turn is being made.

The lever or tongue 16 has both transverse swinging movement, and, in conjunction with the links 21, will avoid side draft.

What is claimed is:

1. In a draft equalizer, a cross member, a forwardly-extended draft tongue, mechanism for mounting the tongue on the cross member for lateral swinging movement and for movement longitudinally of the tongue, a link, a first pivot element connecting the rear end of the link with the intermediate portion of the cross member, and a second pivot element connecting the forward end of the link with the rear portion of the tongue, said mechanism constituting a fulcrum for the tongue and being located in advance of the second pivot element, said mechanism comprising an anti-friction device carried by the cross member, the tongue having an elongated longitudinal opening wherein the anti-friction device is received.

2. In a draft equalizer, a cross member, a forwardly-extended draft tongue, mechanism for mounting the tongue on the cross member for lateral swinging movement and for movement longitudinally of the tongue, a link, a first pivot element connecting the rear end of the link with the intermediate portion of the cross member, and a second pivot element connecting the forward end of the link with the rear portion of the tongue, said mechanism constituting a fulcrum for the tongue and being located in advance of the second pivot element, said mechanism comprising a roller journalled on the cross member, the tongue having an elongated longitudinal opening receiving the roller, the diameter of the roller being substantially equal to the width of the opening.

3. In a draft equalizer, a cross member, a forwardly-extended draft tongue, mechanism for mounting the tongue on the cross member for lateral swinging movement and for movement longitudinally of the tongue, a link, a first pivot element connecting the rear end of the link with the intermediate portion of the cross member, a second pivot element connecting the forward end of the link with the rear portion of the tongue, said mechanism constituting a fulcrum for the tongue and being located in advance of the second pivot element, and means for holding the tongue against lateral swinging movement with respect to the cross member, at the will of the operator.

4. In a draft equalizer, a cross member, a forwardly-extended draft tongue, mechanism for mounting the tongue on the cross member for lateral swinging movement and for movement longitudinally of the tongue, a link, a first pivot element connecting the rear end of the link with the intermediate portion of the cross member, a second pivot element connecting the forward end of the link with the rear portion of the tongue, said mechanism constituting a fulcrum for the tongue and being located in advance of the second pivot element, and a plurality of spaced means on the cross member, and located on opposite sides of the first pivot element, for connecting to the cross member the object to be drawn.

VENCEL J. TICHOTA.